United States Patent Office 3,326,979
Patented June 20, 1967

3,326,979
CONDENSATION REACTIONS IN DIMETHYL
SULFOXIDE SOLUTION AND SULFOXIDES
Glen A. Russell, c/o Dept. of Chemistry, Iowa State
University, Ames, Iowa 50010
No Drawing. Original application May 13, 1963, Ser. No.
280,109, now Patent No. 3,256,340, dated June 14,
1966. Divided and this application Apr. 5, 1966, Ser.
No. 540,183
3 Claims. (Cl. 260—607)

This application is a division of copending application Serial No. 280,109, filed May 13, 1963, and issued June 14, 1966 as U.S. Patent No. 3,256,340.

This invention relates to a process for the condensation of dimethyl sulfoxide with aldeyhdes and ketones. It further relates to the condensation of aromatic aldehydes with active methylene compounds. It is also concerned with the intermediates and ultimate products obtained by these processes.

One of the principal objects of the present invention is to provide a novel type of condensation reaction, whereby valuable new products result. The final products are variously useful as, for instance, chelating agents for metal ions, as intermediates in olefin syntheses, and in high melting polymeric systems. The sulfoxides are valuable intermediates for the synthesis of sulfur-free compounds because of their ability to:

(1) undergo pyrolysis

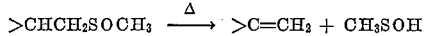

(2) to form sulfones which can undergo elimination in the presence of base

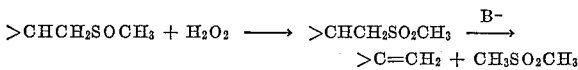

(3) to undergo the Pummerer rearrangement with strong acids

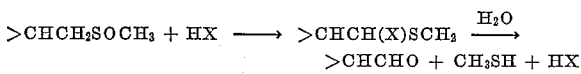

Other objects and advantages of this invention will become apparent from the ensuing disclosure and claims.

These objects are realized by the present invention, which in its broader aspects comprises condensing an aromatic compound with an active methylene compound in an alkaline solvent medium comprising dimethyl sulfoxide and a strong base. In a preferred first step of the process, the aromatic compound is simply dissolved in the alkaline medium at a relatively low temperature to form an adduct with the dimethyl sulfoxide itself. This adduct is then dehydrated to provide an unsaturated sulfoxide, and this latter compound is then condensed with the desired active methylene compound, again in an alkaline medium comprising dimethyl sulfoxide and a strong base. According to a second preferred embodiment of the invention, an aromatic aldehyde is reacted directly with the desired active methylene compound in the alkaline solvent medium comprising DMSO (dimethyl sulfoxide) and the strong base.

According to still more specific embodiments of the invention, it has first of all been found that dimethyl sulfoxide readily forms 1:1 adducts with aromatic ketones and aldehydes, such as benzaldehyde, fluorenone, benzophenone and anthraquinone, in the prsence of alkoxide ions, e.g. t-butoxide ion, and in the presence of excess DMSO or DMSO-t-butyl alcohol mixtures as solvents. The compounds thus formed are new and have the structure

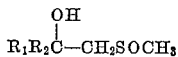

wherein $R_1$ is an aromatic radical and $R_2$ is either hydrogen or an aromatic radical.

Next, it has been found that aromatic aldehydes (RCHO) will react in DMSO solution in the presence of strong bases such as potassium t-butoxide with active methylene compounds (R'R''CH$_2$), such as diphenylmethane, to yield new sulfoxides of the structure R'R''CH—CHR—CH$_2$SOCH$_3$, wherein R, R' and R'' are each selected from the group consisting of phenyl and substituted phenyl. These sulfoxides can be converted to the corresponding sulfones by treatment with hydrogen peroxide or to valuable olefins, like the corresponding 1,1,2-tri-substituted propene by the action of strong base, or the 2,3,3-tri-substituted propene isomer by thermal decomposition.

Third, it has been found that active methylene compounds of the type R'CH$_3$, wherein R' is a substituted phenyl, such as phenyl-p-tolysulfone, will condense with aromatic aldehydes (RCHO) in DMSO-t-butyl alcohol solution, again in the presence of a strong base, to give a wide variety of stilbene derivatives $$R'CH_3 + RCHO \rightarrow R'CH=CHR$$

The dimethyl sulfoxide adducts are of course useful as intermediates for the subsequent condensation with the active methylene compounds. They are also useful per se as chelating agents for metal ions, particularly in their oxidized form RCOCH$_2$SOCH$_3$ or $$RCOCH_2SO_2CH_3$$

They also constitute intermediates in the synthesis of vinyl ethers, viz.:

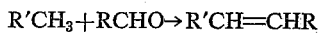
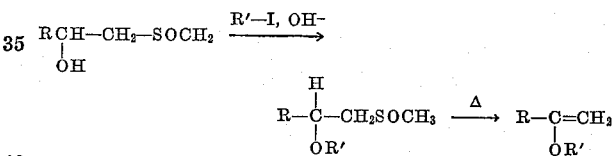

The condensates with the active methylene compounds of the type R'R''CH$_2$ and the related products of the type R'R''CH—CHR—CH$_2$SO$_2$CH$_3$ are useful intermediates in the preparation of olefins. For instance, they can be converted readily with heat and/or alkaline conditions to olefins such as R'R''CH—CR=CH$_2$, $$R'R''C=CR—CH_3$$

and R'R''C=CHR.

Other valuable specific compounds, prepared according to the processes of this invention, are:
(C$_6$H$_5$)$_2$C=C(CH$_3$)(C$_6$H$_4$OCH$_3$)
(C$_6$H$_5$)$_2$CH—C(C$_6$H$_4$OCH$_3$)=CH$_2$
(C$_6$H$_5$)$_2$CH—C(C$_6$H$_5$)=CH$_2$
C$_6$H$_5$SO$_2$—C$_6$H$_4$CH=CH—C$_6$H$_4$—X, X= —OMe,
—SO$_2$C$_6$H$_5$ etc.

The three preferred condensation reactions of this invention can be written mechanistically:

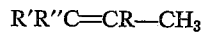
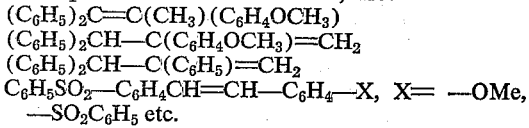

and

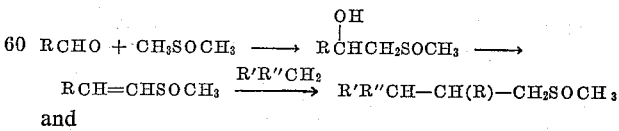
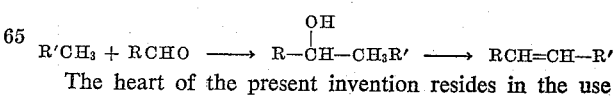

The heart of the present invention resides in the use of dimethyl sulfoxide as a major part of the reaction medium wherein the aromatic aldehydes and ketones are condensed, and in the presence in this medium of a strong base. Provided these critical limitations are met, a wide variation is readily possible in the other operating conditions such as temperatures, times, aldehydes and ketones and active methylene compounds being interreacted, etc. The useful aldehydes and ketones are those which are aromatic in nature and have no ionizable (acidic) alpha-hydrogenation. Generally preferred are benzene derivatives having at least one carbon ring in the molecule, for instance benzene itself, naphthalene and anthracene derivatives.

The useful active methylene compounds have either the formula R'CH₃ or the formula R'R''CH₂. In both of these classes of compounds the R' and R'' are either phenyl per se or substituted phenyl, for instance diphenyl methane, ditolyl methane, phenyl p-tolyl sulfone, monophenyl-monotolyl methane, cyclohexanone and acetophenone.

As usual in chemical reactions, the reaction times and temperatures are interdependent and may readily be adjusted by those skilled in the art, depending on the reactants employed. It is generally preferred to operate all of the condensation steps at temperatures substantially between 20° and 80° C. For the initial formation of the dimethyl sulfoxide adduct, temperatures between about 20° and 80° C., particularly 20° to 40° C., are usually sufficient. Elevated temperatures are employed, for instance between about 50° and 70° C., to dehydrate such an adduct and obtain the corresponding unsaturated sulfoxide. For direct condensation of the aromatic aldehyde with the active methylene compound, particularly satisfactory temperatures range between about 30° and 60° C., while for condensing the aldehyde sulfoxide with the active methylene compound, somewhat lower temperatures, from about 20° to 40° C., are normally sufficient. Depending upon the particular temperature and the particular operation, the times for complete reaction may vary anywhere from about 5 minutes to about 4 hours. Generally the adduct formation proceeds rapidly, said in 10 to 30 minutes, dehydration of the adduct takes from 1 to 2 hours, and condensation with the active methylene compounds requires from ½ to 2 hours.

The solvent medium in which the condensation reactions take place may be made alkaline by use of a number of different types of strong bases. Particularly valuable are the alkali metal oxides, hydroxides, hydrides and alkoxides, as well as the alkali metals themselves, e.g. sodium, potassium and lithium methoxides, ethoxides, propoxides and butoxides, the corresponding hydrides, hydroxides and oxides. Preferred proportions of the alkali metal compound range from about 0.1 to 3.0 moles per mole of the aromatic aldehyde to be reacted. Dimethyl sulfoxide may be used alone in excess both as the solvent medium and as the reactant. In many cases, however, up to about 50% by volume, and usually from 10 to 25%, of the medium may be tertiary butyl alcohol. The use of tertiary butyl alcohol as a co-solvent is advantageous since it stabilizes the basic solution from reaction with oxygen. Operable solvent constituents in lieu of the tertiary butanol are other alcohols such as methanol, ethanol, and tertiary alcohols in general.

The following examples are given simply to illustrate this invention and not in any way to limit its scope.

Example I

To a solution of 1.7 grams (10⁻² mole) of diphenylmethane in 15 milliliters of dimethyl sulfoxide under a blanket of nitrogen at a temperature of 60° C. were added 1.34 grams (1.2×10⁻²) of potassium tertiary butoxide that has been purified by sublimation in vacuum. The resulting solution was orange-red in color.

A solution of 1.4 grams (10⁻² mole) of p-anisaldehyde in 5 milliliters of dimethyl sulfoxide at a temperature of 40° C. was gradually added to the first solution over a period of 4 minutes, also under the blanket of nitrogen. The resulting solution first turned to a deep red color, but changed to green after completion of the addition of all of the anisaldehyde. This combined solution was maintained at 40° C., while blanketed with nitrogen, for an additional period of 2 hours, after which water containing ice was added. The mixture containing precipitated solids was then shaken with 30 milliliters of ether and the solids separated by filtration. In this manner 2.0 grams, equivalent to 50 percent of the stoichiometric yield, of colorless crystals were obtained. These crystals, after recrystallization from hot ethanol, has a melting point of 178–180° C. From the filtered aqueous phase, an additional 500 milligrams of impure product were obtained by extraction with ether.

The infrared spectrum, integrated nuclear magnetic resonance spectrum, molecular weight, and elemental analyses for carbon, hydrogen, and sulfur, results of some of which are included hereinbelow, as well as degradation reactions and oxidation to a sulfone, that are described hereinafter, support the following formula for this product:

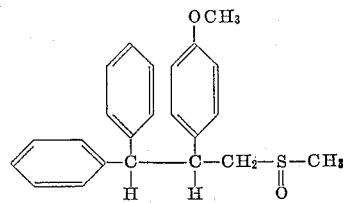

*Analysis (percentages by weight)*.—Found: C, 75.78; H, 6.94; S, 8.94. Molecular weight (dioxane), 380. Calculated for C₂₃H₂₄O₂S; C, 75.80; H, 6.64; S, 8.78. Molecular weight, 364.6.

Substitution of cyclohexanone for the diphenylmethane in this reaction, on an equivalent molar basis, produced the sulfoxide:

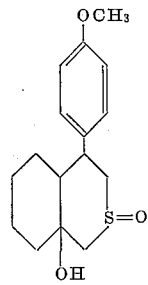

Recrystallization from ethanol by the addition of a little chloroform gave M.P. 275–6°. The IR and NMR spectra were consistent with the above structure. The NMR spectrum failed to show a methyl group other than that of the p-methoxy group.

*Analysis*.—Calculated C₁₆H₂₂O₃ S (294.34); C, 65.29; H, 7.53; S, 10.82. Found: C, 65.31; H, 7.69; S, 11.00.

Example II

To a solution of 1.7 gram (1×10⁻² mole) of diphenylmethane in 30 milliliters of dimethyl sulfoxide was added 2.24 grams of sublimed potassium tertiary butoxide under a blanket of nitrogen. p-Anisaldehyde, 1.4 g. (1×10⁻² mole) was gradually added to the first solution from a burette during the course of 14 minutes. The resulting solution was heated to 65° C. and maintained at this temperature for 2.5 hours. Then about 100 milliliters of water at 0° C. were added, and the mixture was shaken with about 50 milliliters of ether. A precipitate of 0.185 grams of 1-(methylsulfinyl)-2-p-methoxyphenyl-3,3-diphenylpropene was removed by filtration. The aqueous layer was extracted with 700 ml. of ether. Evaporation of the ether yielded an oil which crystallized when treated with a trace of ethanol to yield 2.09 grams of crystals, M.P. 103–4° of 1,1-diphenyl-2-(p-methoxyphenyl)-propene-1 (70% yield). It has the formula hereinbelow, as shown by its infrared and integrated nuclear magnetic resonance spectra, its molecular weight and its elemental analysis.

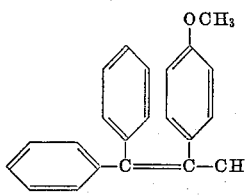

*Analysis.*—Found: C, 88.07; H, 6.86; Molecular weight (dioxane), 313. Calculated for $C_{22}H_2O$; C, 87.96; H, 6.71. Molecular weight, 300.4.

Example III

The same propene-1 derivative of Example II was also obtained by treating the corresponding dimethyl sulfoxide adduct as follows:

Three hundred mg. of the product of Example I were dissolved in a mixture of 4 ml. of dimethyl sulfoxide and 1 ml. of t-butyl alcohol at 60° C. under nitrogen, and 112 mg. potassium t-butoxide were added. After standing at 60–65° C. for one hour, the reaction mixture was kept at room temperature for 3:5 hours, and then again kept at 60° for 0.5 hour. Then 50 ml. of water were added together wth 50 ml. of ether. The mixture was shaken and filtered, leaving unreacted starting material as an ether-insoluble residue. From the ether solution 118 mg. of 1,1-diphenyl-2-(p-methoxyphenyl)-propene-1 crystallized after evaporation of the solvent. Its infrared absorption spectrum was identical with that of an authentic sample. (Yield 46.5%)

An isomer of this product was also obtained by pyrolysis of the sulfoxide product of Example I, as follows:

Four hundred mg. of the product of Example I were treated in an oil bath under 15–20 mm. pressure at 200–220° C. for 17 minutes, at the end of which time the gas evolution had ended. The colorless oily residue was dissolved in 8 ml. of a mixture of chloroform and ethyl alcohol and the solution filtered. After standing overnight, 300 mg. of 3,3-diphenyl-2-(p-methoxyphenyl) propene-1 was isolated as colorless crystals, M.P. 71° C., yield 91%. This compound had the structure:

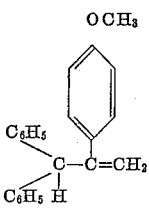

*Analysis.*—Calculated for $C_{22}H_{20}O$; C, 87.96; H, 6.71; —$OCH_3$, 10.33. Found: C, 88.03; H, 6.63; —$OCH_3$, 10.03.

It reacts readily with bromine in chloroform. The NMR spectrum supports this structure since the terminal methylene group is readily apparent.

Example IV p-Anisaldehyde, 1.36 g. ($1 \times 10^{-2}$ mole) was dissolved in excess dimethyl sulfoxide (12 ml.) containing 3 ml. of t-butyl alcohol and 1.12 grams of potassium tertiary butoxide. The mixture was maintained in an inert atmosphere at 25° C. for 1 hour. The resulting 1:1 dimethyl sulfoxide adduct and the formula $R_1CHOHCH_2SOCH_3$, $R_1$ being p-methoxyphenyl. It was isolated in 40% yield, M.P. 129–131°, on recrystallization from hot ethanol.

*Analysis.*—Calcd. for $C_{10}H_{14}O_3S$ (214.21); C, 56.07; H, 6.59; S, 14.91. Found: C, 56.09; H, 6.46; S, 15.10.

This process was repeated, substituting piperonal in the same molar proportion for the p-anisaldehyde, and holding the mixture at 30° C. for 45 minutes. The corresponding adduct ($R_1$ being 3,4-methylenedioxyphenyl) was obtained in 21% yield, melting point 160° C.

*Analysis.*—Calcd. $C_{10}H_{12}O_4S$ (228.20); C, 52.63; H, 5.30; S, 14.0. Found: C, 52.44; H, 5.43; S, 14.21.

Example V

The p-anisaldehyde: dimethyl sulfoxide adduct (53 mg.) of Example IV was returned to an alkaline medium consisting of 56 mg. of potassium t-butoxide in 2 ml. of dimethyl sulfoxide and heated at 60° C. for 10 minutes. The resulting unsaturated sulfoxide, obtained in 47% yield, had the formula $R_1CH=CHSOCH_3$ ($R_1$ being p-methoxyphenyl); melting point 67–68° C.

Example VI

To a solution of potassium t-butoxide (560 mg.) in 10 cc. of DMSO at room temperature, 0.7 cc. (5 mmole) of p-anisaldehyde was added dropwise under an atmosphere of dry, prepurified nitrogen at room temperature. The solution was warmed to 60–65° for 80 minutes. After this time 100 cc. of water was added to the brown solution to yield an emulsion. The emulsion was extracted with 500 ml. of ether, the ether extract dried over sodium sulfate and evaporated to yield a light yellow oily residue that crystallized upon treatment with a little ether to give 450 mg. (46%) of β-(methylsulfinyl)-p-methoxystyrene in the form of fine, colorless needles, M.P. 65°. Recrystallization from ether raised the M.P. to 67–68°.

*Analysis.*—Calcd. $C_{10}H_{12}O_2S$ (196.20); C, 61.21; H, 6.17; S, 16.31. Found: C, 61.11; H, 6.33; S, 16.00.

Example VII

The condensation of 1.7 grams ($1 \times 10^{-2}$ mole) diphenyl-methane and 1.0 grams ($1 \times 10^{-2}$ mole) benzaldehyde in 15 ml. of dimethyl sulfoxide containing 1.12 grams potasium t-butoxide, at 60° C. for 15 minutes followed by 30 minutes at room temperature, yielded colorless crystals of the following sulfoxide, M.P. 195–196° C.

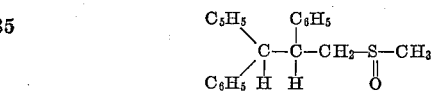

*Analysis.*—Calcd. $C_{22}H_{22}OS$: C, 79.01; H, 6.63; S, 9.57. Found: C, 78.98; H, 6.72; S, 9.21.

An oil was also obtained which upon heating with ethanol yields 430 mg of 1,1,2-triphenylpropene-1, M.P. 88–89°.

Example VIII

The initial product of Example VII (200 mg., 0.6 mmole) was heated under aspirator vacuum in oil bath at 200–225° for 10 minutes. Gas evolution ceased after 5 minutes. The almost colorless oil which remained was dissolved in 2 cc. of warm ethanol to yield 96 mg. (61%) of colorless 2,3,3-triphenyl-1-propene, M.P. 49–50°, after evaporation of solvent.

*Analysis.*—Calcd. for $C_{21}H_{18}$(270.35); C, 93.29; H, 6.71. Found: C, 93.10; H, 6.76.

Example IX

A solution was prepared of 5.2 millimoles of benzophenone in 30 milliliters of a mixture of 80 parts by volume of dimethyl sulfoxide and 20 parts by volume of tertiary butyl alcohol. This solution was stirred and maintained under an inert atmosphere of nitrogen while 5.7 millimoles of potassium tertiary butoxide, purified by sublimation, were added. Afrter continuing the stirring for 15 minutes at prevailing room temperature, water was added, producing a precipitate which was separated by filtration and washed with water. The precipitated product had a melting point of 148–150° C., and the formula

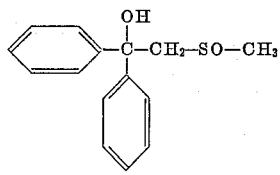

which was confirmed by nuclear magnetic resonance spectral examination and the following elemental analysis (percent by weight).

Found: C, 69.50; H, 5.95; S, 12.36. Calculated for $C_{15}H_{16}O_2S$: C, 69.20; H, 6.20; S, 12.32.

This process is successfully repeated utilizing other solvent media; one consisting of 10 parts by volume of the t-butanol and 90 parts by volume of the dimethyl sulfoxide; a second consisting of 25% by volume of t-butanol to 75% of the DMSO; and a third consisting only of dimethyl sulfoxide.

Example X

A solution of two millimoles of anthraquinone in 25 milliliters of an 80–20 mixture (by volume) of dimethyl sulfoxide and tertiary butyl alcohol containing 4 millimoles of potassium tertiary butoxide was maintained under an atmosphere of nitrogen and stirred gently for 1 hour. Water was added to the reaction mixture and the product was recovered by the procedure of Example VIII. A yield of 1.64 millimoles was thus obtained of the dimethyl sulfoxide adduct, melting point 156–156.5° C. and formula

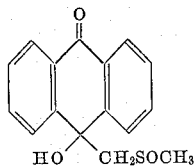

Elemental analysis: Found: C, 66.91; H, 5.14; S, 11.75. Calculated for $C_{16}H_{14}O_3S$: C, 67.11; H, 4.93; S, 11.20.

Example XI

The procedure here was generally as described in Examples IX and X. Two millimoles of 9-fluorenone were dissolved in 10 milliliters of the 80–20 mixture of dimethyl sulfoxide and tertiary butyl alcohol, together with 4 millimoles of potassium tertiary butoxide. A yield of 90 percent was obtained after 5 minutes at room temperature. The product had the formula hereinbelow, which was confirmed by its nuclear magnetic resonance spectrum and the following elemental analysis (percent by weight):

Found: C, 69.29; H, 5.61; S, 12.34. Calculated for $C_{15}H_{14}O_2S$: C, 69.74; H, 5.46; S, 12.41.

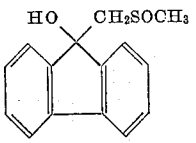

Proceeding as described above but using only one-tenth (0.4 millimole) of the foregoing amount of potassium tertiary butoxide for the 2.0 millimoles of fluorenone, and a reaction period of 4 hours at room temperature instead of 5 minutes, the amount of dimethyl sulfoxide adduct obtained was 1.36 millimoles, a yield of 68%.

Example XII

Five hundred eighty mg. (2.5×10⁻³ mole) of phenyl-p-tolylsulfone were dissolved in 11 ml. dimethyl sulfoxide (DMSO) and 2 ml. t-butyl alcohol. Under a nitrogen atmosphere 560 mg. of sublimed potassium t-butoxide, (5×10⁻³ mole) were added. While stirring under a nitrogen atmosphere at room temperature, 1 ml. of benzaldehyde in 4 ml. DMSO and 1 ml. t-butyl alcohol were added from a burette over the course of 10 minutes. The reddish solution turned green. The stirring was continued for 30 more minutes. Then 50 ml. of water were added, yielding a colorless crystalline precipitate. This was filtered and washed with warm absolute ethanol, yielding 320 mg. of pure p-(phenylsulfonyl)-stilbene, M.P. 184–185° (40% yield). It can be recrystallized from chloroform.

*Analysis.*—Calculated for $C_{20}H_{16}O_2S$: C, 74.99%; H, 5.03%; S, 9.99%. Found: C, 74.82%; H, 5.01%; S, 10.01%.

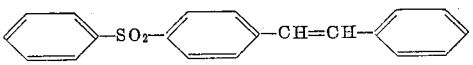

The nuclear magnetic resonance spectrum (in CDCl₃, 60 Mc./sec.) does not show any saturated protons. The protons in the aromatic and olefinic region appear in the ratio 4:10:2.

Example XIII

The following stilbenes have been prepared in a similar manner, starting from phenyl-p-tolylsulfone and the corresponding aldehydes. Their structures are supported by analysis, infrared absorption and N.M.R. spectra.

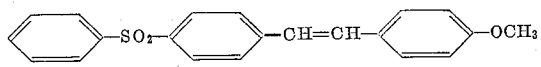

32% yield, colorless crystals M.P. 202–203°

*Analysis.*—Calculated for $C_{21}H_{18}O_3S$: C, 71.99; H, 5.18; S, 9.13. Found: C, 71.77; H, 502; S, 9.36.

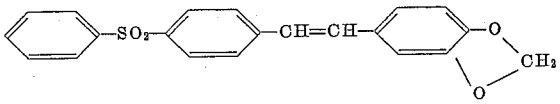

5.5% yield, colorless crystals M.P. 188°

*Analysis.*—Calculated for $C_{21}H_{16}O_4S$: C, 69.22; H, 4.43; S, 8.78. Found: C, 69.10; H, 4.27; S, 8.99.

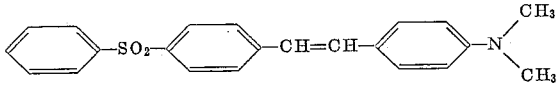

11% yield, yellow crystals M.P. 250–251° C.

*Analysis.*—Calculated for $C_{22}H_{21}NO_2S$: C, 72.71; H, 5.82; N, 3.85. Found: C, 72.51; H, 5.72; N, 4.09.

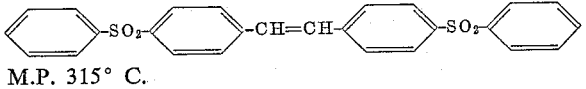

M.P. 315° C.

*Analysis.*—Calculated: C, 67.82; H, 4.38; S, 13.9. Found: C, 67.71; H, 4.68; S, 13.43.

Example XIV

The processes of Examples X and XIII are repeated, using the following alkali metal bases in lieu of potassium t-butoxide, each at two different concentrations, 0.1 and 3.0 moles per mole of aldehyde: lithium tertiary butoxide, sodium ethoxide, potassium hydroxide, sodium oxide, lithium methoxide, and sodium hydride. In each instance the reaction proceeds smoothly and the desired product is obtained.

What is claimed is:

1. Dimethyl sulfoxide adducts having the formula $R_1R_2COHCH_2SOCH_3$, wherein $R_1$ is an aromatic radical and $R_2$ is selected from the group consisting of hydrogen and an aromatic radical, each of said aromatic radicals being selected from the group consisting of phenyl, benzyl and methoxyphenyl.

2. A process for forming adducts of dimethyl sulfoxide with those aromatic aldehydes and aromatic ketones which are selected from the group consisting of benzaldehydes and benzophenones which have no acidic alpha-hydrogen atom fluorenones and anthiaquinone, which comprises contacting the said aromatic compound at a temperature between about 20° and about 80° C. with a solvent medium consisting essentially of dimethyl sulfoxide and between 0 and 50% by volume of tertiary butanol, in the presence of a strong base selected from the class consisting of alkali metal oxides, alkali metal hydroxides, alkali metal alkoxides, and alkali metal hydrides.

3. A process for preparing condensates of benzaldehydes which have no acidic alpha-hydrogen atom, with active methylene compounds selected from the group consisting of phenyl alkyl ketones; ketohexamethylene; compounds having the formula R'R"CH$_2$ where in R' is selected from the group consisting of phenyl, lower alkyl-substituted phenyl, phenylsulfonyl and methylsulfinyl, and R" is selected from the group consisting of phenyl, lower alkyl-substituted phenyl and phenyl sulfonyl; and compounds having the formula R'CH$_3$ wherein R' is selected from the group consisting of methylsulfinyl and substituted phenyl, wherein the substituent is acid-strengthening, which process comprises first dissolving the said aldehyde in an alkaline medium consisting essentially of dimethyl sulfoxide and an alkali metal alkoxide at a temperature substantially between 20° and 40° C., dehydrating the sulfoxide adduct thereby formed by heating to substantially between 50° and 70° C., and condensing the unsaturated sulfoxide thereby formed with the said active methylene compound at a temperature substantially between 20° and 40° C. in an alkaline medium consisting essentially of dimethyl sulfoxide and an alkali metal alkoxide.

No references cited.

CHARLES B. PARKER, *Primary Examiner.*

DELBERT R. PHILLIPS, *Assistant Examiner.*